(12) United States Patent
Lee

(10) Patent No.: US 6,481,425 B1
(45) Date of Patent: Nov. 19, 2002

(54) AIR QUANTITY CONTROL FOR SMOOTH SWITCHING IN GASOLINE DIRECT INJECTION ENGINE

(75) Inventor: Ki-Ho Lee, Windsor (CA)

(73) Assignee: Siemens VDO Automotive Inc., Tilbury (CA)

( * ) Notice: Subject to any disclaimer, the term of this patent is extended or adjusted under 35 U.S.C. 154(b) by 56 days.

(21) Appl. No.: 09/654,657

(22) Filed: Sep. 5, 2000

Related U.S. Application Data

(60) Provisional application No. 60/158,920, filed on Oct. 12, 1999.

(51) Int. Cl.[7] ................................................ F02B 23/00
(52) U.S. Cl. .................... 123/586; 123/584; 123/184.53
(58) Field of Search ................................. 123/295, 586, 123/585, 184.53, 294, 184.56, 184.58

(56) References Cited

U.S. PATENT DOCUMENTS 4,182,295 A * 1/1980 Zeller et al. .......... 123/119 EC
4,700,676 A   10/1987 Harashima et al.
5,636,619 A *  6/1997 Poola et al. ................. 123/585
5,709,191 A    1/1998 Monnier
6,101,998 A *  8/2000 Tamura et al. .............. 123/295

FOREIGN PATENT DOCUMENTS

EP          0848146       6/1998
EP          0884464      12/1998
JP          05099032      4/1993

* cited by examiner

Primary Examiner—Bibhu Mohanty

(57) ABSTRACT

A gasoline direct injection engine is provided with a bypass air supply line. The bypass line is selectively opened to allow additional flow of air into the engine chamber during a transition phase. Air normally flows through a main air supply line through a plenum. However, during a transition from a low air volume early injection phase to a relatively high air volume late injection phase the valve is opened to provide additional flow through the bypass. In this way, the air can be more quickly delivered to the engine chamber.

12 Claims, 1 Drawing Sheet

AIR QUANTITY CONTROL FOR SMOOTH SWITCHING IN GASOLINE DIRECT INJECTION ENGINE

This application claims priority to provisional application No. 60/158,920 filed on Oct. 12, 1999.

BACKGROUND OF THE INVENTION

This invention relates to a method and structure for providing an air bypass to more quickly supply air during transition stages for gasoline direct injection engines.

Gasoline direct injection engines are known and have air supply flow line supplying air through an enlarged chamber, or plenum, under the control of a throttle valve. Air is delivered through the supply line to the engine piston cylinder, where it mixes with fuel. As known, during the control of this type engine, there are two distinct combustion modes. First, early injection occurs under stoichiometric operation, wherein the air to fuel ratio is relatively low. After initial startup, the air ratio increases dramatically. The air quantity required in late injection mode is typically at least double that of early injection mode.

The prior art operates well in adequately supplying air during both the early injection and late injection modes, once they have been achieved. However, there is actually a third mode, which is a transition mode between early injection and late injection. In this mode, the prior art has not always adequately delivered sufficient quantity of air to the engine as quickly as would be desired.

Applicant has determined the problem occurs due to the plenum in the path of the air injection line. Due to the relatively large plenum chamber volume, the increase in air flow to the plenum takes a period of time to be translated into an increase in air volume leaving the plenum and reaching the engine.

SUMMARY OF THE INVENTION

In a disclosed embodiment of this invention, an air bypass line is disposed to deliver a bypass quantity of air to the engine during the transition phase. This bypass quantity bypasses the plenum volume.

In a preferred embodiment of this invention the bypass line is relatively small compared to the main supply line. As an example, the bypass line could have a cross-sectional area which is less than half the cross-sectional area of the main supply line. In one preferred embodiment the quantity is actually less than a third of the area of the main supply line.

The valve is controlled by an ECU which also controls the engine. Thus, when the ECU begins to enter transition mode between early injection and late injection, the valve is open to allow the bypass air to reach the engine chambers. In this way, sufficient air is provided during this transition mode. Once the steady state operation has been achieved, the valve may again be closed although it may be left open to supplement the flow. This alternate control allows the plenum and main flow line to be smaller.

The preferred embodiment maintains the valve open at late injection to supplement the flow there through the main supply line. The method works when moving from late to early injection conditions and in a generally reverse manner. That is, beginning with late injection, the bypass valve is typically open. As the transition period is approached, this valve is closed, and remains closed at the early injection stage.

These and other features of the present invention can be best understood from the following specification and drawings, the following of which is a brief description.

DETAILED DESCRIPTION OF A PREFERRED EMBODIMENT

Figure 1:
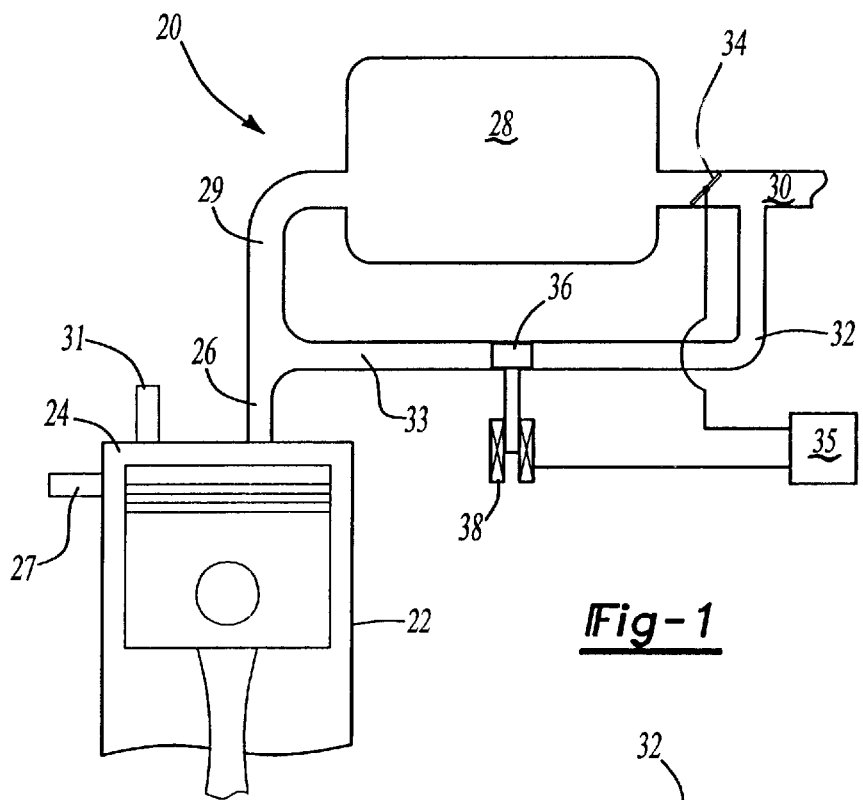
FIG. 1 is a schematic view of an inventive system.

A gasoline direct injection engine 20 is illustrated in FIG. 1 having an engine cylinder 22 including a chamber volume 24. An exhaust port 27 leads from the chamber 24. An air supply line 26 also leads into the chamber, as does a fuel injection line 31. The basic operation and structure of engine is as known, and forms no portion of this invention.

Air supply line 26 passes through an enlarged chamber plenum 28 from a clean air supply 30. A passage 29 connects the plenum 28 to the supply line 26, as known. A throttle valve 34 is controlled by an ECU 35 to control the amount of air flow to the chamber 24. As mentioned above, when it is desired to rapidly increase the volume of air being delivered to the chamber 24, the plenum 28 creates a delay in increasing the volume. Of course, during this rapid increase in the volume of air, the throttle valve 34 will be opened.

A plenum, as is known in the art, can be described as an enlarged volume chamber having an inlet and an outlet passage of smaller cross-sectional areas. In this way, a relatively large quantity of air is maintained in the plenum 28.

Thus, the present invention incorporates a bypass passage 32 communicating to the supply line 26 without passing through the plenum 28. A valve 36 closes the passage 32 unless opened by valve control 38. Valve control 38 communicates with the ECU 35. The cross-sectional area of the bypass passage 33 is relatively small compared to the passage size at 29. As an example, the cross-sectional area of the passage 32 may be less than half that of passage 29. More preferably, the cross-sectional area of the passage 32 is less than a third of the cross-sectional area of the passage 29. The purpose of the bypass passage is to provide additional air to the engine as the engine goes through a transition period during which is rapidly increases the volume of air being delivered to the chamber 24. Without this additional bypass passage, the prior art has experienced some difficulty in rapidly increasing the volume of air flowing the engine cylinder.

Figure 2:
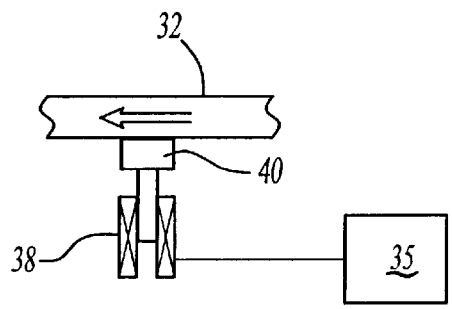
FIG. 2 shows the inventive valve in the open bypass position.

As shown in FIG. 2, when the engine enters its transition phase, the ECU 35 controls the valve control 38 to open the valve to position 40 such as shown in FIG. 2. Air can now pass through the passage 32 into the supply line 26 and into the chamber 24. In this way, the volume of air being delivered to the chamber 24 can be rapidly increased. The valve 38 is shown as a simple solenoid valve, however, any type of valve which is controllable by an electronic control to open or close the passage 32 can be utilized.

Figure 3:
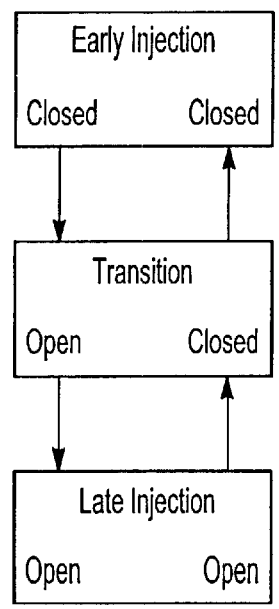
FIG. 3 is a simple flowchart of the instant invention.

As shown in FIG. 3, a flowchart for the control of the inventive valve is shown in a simplified manner. During early injection the valve is maintained closed. Also, at late injection the valve may be closed once steady state has been achieved. However, in a transition from early injection to late injection the valve is opened as shown in FIG. 2. In this fashion, additional air can flow from the source 30 through both the bypass line 32 and the main line 29 into the supply line 26. In this way, air can be more rapidly delivered to the chamber 24 during the transition phase. Once the volume of air passing to the chamber 24 has been achieved to a desired volume, the valve can again be closed. The valve can also be left opened to supplement the large volume flow through line from main line 29. This may allow the passage 29 to be smaller than would be required. Steady state operation can be achieved with all air passing through the plenum 28.

The control 35 would be programmed to know how much and for how long to open the valve 36 to create the proper amount of fuel/air ratio. Further, the control would be programmed to know when the flow through the main injection line 29 would begin to be sufficient to meet all of the air flow needs in the late injection period. The control 35 may be programmed to begin closing the valve 36, once the air flow has reached the needed volumes. Again, this closing may not be used. The information that would be programmed into the control to achieve these goals could be determined experimentally once a particular engine and air injection system has been designed.

As mentioned above, when moving from late injection operation to early injection operation, the bypass valve will begin to move in the opposed direction. The bypass valve is preferably maintained open in the late injection phase, and as the transition stage is approached, the bypass valve is closed. The bypass valve is maintained closed for the early injection under this system of operation.

A preferred embodiment of this invention has been disclosed, however, a worker in this art would recognize that modifications would come within the scope of this invention. For that reason, the following claims should be studied to determine the true scope and content of this invention.

What is claimed is:

1. An air supply for a gasoline direct injection engine comprising:
    a main air supply line communicating with a source of air, said source of air passing through an enlarged volume plenum to a main supply passage, said main supply passage for communicating with an engine chamber;
    a bypass air supply passage communicating with a source of clean air, said bypass air supply passage for communicating with the engine chamber without passing through said enlarged volume plenum;
    a valve for being controlled by an engine control, said valve being operable to selectively open said bypass passage to provide additional air to the engine chamber; and
    a first relatively low air/fuel ratio is utilized at early stages of injection, and a higher air/fuel ratio is utilized at later stages of injection, and said bypass being closed at said early stage of injection, with said bypass valve being opened during a transition period at which the engine is moving from said early injection to said late injection stage.

2. An air supply as set forth in claim 1, wherein said bypass passage communicates from a single passage leading both to said bypass passage and to said plenum, said bypass passage branching off from said single passage and around said plenum, and said bypass passage being reconnected to a main flow downstream of said plenum such that a single injection air line extends into the engine chamber.

3. An air supply as set forth in claim 1, wherein a throttle valve is placed on said main air supply line upstream of said plenum.

4. An air supply as set forth in claim 1, wherein said bypass valve remains open at said late stage of injection.

5. An air supply as set forth in claim 1, wherein said bypass valve being maintained open at said late stage of injection, and said bypass valve being closed during a transition period at which the engine is moving from said late injection to said early injection.

6. A gasoline direct injection engine comprising:
    at least one engine cylinder for receiving an air and fuel mixture;
    a main air supply line communicating with a source of air, said source of air passing through an enlarged volume plenum to a main supply passage, said main supply passage communicating with said engine chamber;
    a bypass air supply passage communicating with a source of clean air, said bypass air supply passage communicating with said engine chamber without passing through said enlarged volume plenum;
    a valve being controlled by an engine control, said valve being operable to selectively open said bypass passage to provide additional air to said engine chamber; and
    a first relatively low air/fuel ratio is utilized at early stages of injection, and a higher air/fuel ratio is utilized at later stages of injection, and said bypass being closed at said early stage of injection, with said bypass valve being opened during a transition period at which the engine is moving from said early injection to said late injection stage.

7. An engine as set forth in claim 6, wherein said bypass passage communicates with from a single passage leading both to said bypass passage and to said plenum, said bypass passage branching off from said single passage and around said plenum, and said bypass passage being reconnected to said main flow downstream of said plenum such that a single injection air line extends into said engine chamber.

8. An engine as set forth in claim 6, wherein a throttle valve is placed on said main air supply line upstream of said plenum.

9. An engine as set forth in claim 6, wherein said bypass valve being maintained open at said late stage of injection, and said bypass valve being closed during a transition period at which the engine is moving from said late injection to said early injection.

10. A method of controlling a gasoline direct injection engine comprising the steps of:
    1) providing at least one engine chamber for receiving fuel and an air supply, said air supply including a main air supply line leading through an enlarged volume plenum, such that air is supplied from a source of air through said plenum and into said engine chamber, and providing a bypass line for providing air to said engine chamber without passing through said plenum, said bypass line being selectively closed by a valve;
    2) beginning operation of said engine at an early injection phase wherein an air/fuel ratio is low, and maintaining said valve closed; and
    3) moving to a transition phase wherein said air/fuel ratio is being increased, and opening said valve to allow increased flow of air to said engine through said bypass passage.

11. An air supply for a gasoline direct injection engine comprising:
    a main air supply line communicating with a source of air, said source of air passing through an enlarged volume plenum to a main supply passage, said main supply passage for communicating with an engine chamber;
    a bypass air supply passage communicating with a source of clean air, said bypass air supply passage for communicating with the engine chamber without passing through said enlarged volume plenum;

a valve for being controlled by an engine control, said valve being operable to selectively open said bypass passage to provide additional air to the engine chamber, there being a throttle valve controlling the flow through said enlarged volume plenum to said engine chamber, and both said bypass valve and said throttle valve being opened at the same time under certain conditions; and a first relatively low air/fuel ratio being utilized at early stages of injection, and a higher air/fuel ratio is utilized at later stages of injection, and said bypass being closed at said early stage of injection, with said bypass valve being opened during a transition period at which the engine is moving from said early injection to said late injection stage.

12. A method as set forth in claim 11, wherein a throttle valve is placed on a line communicating with said enlarged volume plenum, with said bypass valve being opened in conjunction with said throttle valve under certain conditions.

* * * * *